United States Patent
Buthmann et al.

(10) Patent No.: US 12,270,416 B2
(45) Date of Patent: Apr. 8, 2025

(54) PUMP ARRANGEMENT WITH A TEMPERATURE CONTROLLABLE HOUSING PART

(71) Applicant: KSB SE & Co. KGaA, Frankenthal (DE)

(72) Inventors: Lukas Buthmann, Frankenthal (DE); Juergen Groeschel, Plech (DE)

(73) Assignee: KSB SE & Co. KGaA, Frankenthal (DE)

( * ) Notice: Subject to any disclaimer, the term of this patent is extended or adjusted under 35 U.S.C. 154(b) by 68 days.

(21) Appl. No.: 17/597,264

(22) PCT Filed: Jul. 1, 2020

(86) PCT No.: PCT/EP2020/068532
§ 371 (c)(1),
(2) Date: Dec. 30, 2021

(87) PCT Pub. No.: WO2021/001428
PCT Pub. Date: Jan. 7, 2021

(65) Prior Publication Data
US 2022/0316497 A1 Oct. 6, 2022

(30) Foreign Application Priority Data

Jul. 1, 2019 (DE) .................. 10 2019 004 538.6
Dec. 10, 2019 (DE) .................. 10 2019 008 561.2
(Continued)

(51) Int. Cl.
*F04D 29/58* (2006.01)
*B22F 10/25* (2021.01)
(Continued)

(52) U.S. Cl.
CPC ............ *F04D 29/588* (2013.01); *B22F 10/25* (2021.01); *B22F 12/38* (2021.01); *F04D 1/00* (2013.01);
(Continued)

(58) Field of Classification Search
CPC .... F04D 29/426; F04D 29/586; F04D 29/588; F04D 15/0263
See application file for complete search history.

(56) References Cited

U.S. PATENT DOCUMENTS 3,936,220 A * 2/1976 Henderson ............ F04D 29/426
415/178
2006/0171801 A1 8/2006 Manabe et al.
(Continued)

FOREIGN PATENT DOCUMENTS

EP 2 713 058 A1 4/2014
FR 2008305 A1 1/1970
(Continued)

OTHER PUBLICATIONS

International Search Report (PCT/ISA/210) issued in PCT Application No. PCT/EP2020/068532 dated Oct. 26, 2020 with English translation (five (5) pages).
(Continued)

*Primary Examiner* — Kenneth Bomberg
*Assistant Examiner* — Cameron A Corday
(74) *Attorney, Agent, or Firm* — Crowell & Moring LLP

(57) ABSTRACT

The invention relates to a pump arrangement (1) with at least one temperature-controllable housing part, wherein at least one temperature-controllable housing part (3) comprises a first wall (27) that is in contact with the temperature-controllable medium and a second wall (28) that is at a distance from the first wall (27). The first wall (27) and the second wall (28) form a temperature control chamber (29).

7 Claims, 7 Drawing Sheets

(30) Foreign Application Priority Data

Jun. 30, 2020 (DE) .................... 10 2020 003 928.6
Jun. 30, 2020 (DE) .................... 10 2020 003 929.4

(51) Int. Cl.
*B22F 12/00* (2021.01)
*F04D 1/00* (2006.01)
*F04D 29/42* (2006.01)
*B22D 25/02* (2006.01)
*B22F 10/28* (2021.01)
*B22F 12/53* (2021.01)
*B33Y 80/00* (2015.01)

(52) U.S. Cl.
CPC ......... *F04D 29/426* (2013.01); *F04D 29/586* (2013.01); *B22D 25/02* (2013.01); *B22F 10/28* (2021.01); *B22F 12/53* (2021.01); *B33Y 80/00* (2014.12)

(56) References Cited

U.S. PATENT DOCUMENTS

| | | | |
|---|---|---|---|
| 2007/0000648 A1 | 1/2007 | Crocker et al. | |
| 2015/0300202 A1* | 10/2015 | Maeda | F02B 39/005 415/180 |
| 2020/0300197 A1* | 9/2020 | Duri | F04D 29/026 |

FOREIGN PATENT DOCUMENTS

| | | | |
|---|---|---|---|
| JP | 2015143476 A | * | 8/2015 |
| RU | 174 862 U1 | | 11/2017 |
| RU | 182 033 U1 | | 8/2018 |
| RU | 184 894 U1 | | 11/2018 |
| WO | WO 2016/116428 A1 | | 7/2016 |

OTHER PUBLICATIONS

German-language Written Opinion (PCT/ISA/237) issued in PCT Application No. PCT/EP2020/068532 dated Oct. 26, 2020 (eight (8) pages).

English-translation of International Preliminary Report on Patentability (PCT/IB/338 & PCT/IB/373) issued in PCT Application No. PCT/EP2020/068532 dated Dec. 28, 2021, including English translation of document C2 (German-language Written Opinion (PCT/ISA/237), filed on Dec. 30, 2021) (nine (9) pages).

Russian-language Office Action issued in Russian Application No. 2021136005/12(075926) dated Oct. 20, 2023 (2 pages).

* cited by examiner

PUMP ARRANGEMENT WITH A TEMPERATURE CONTROLLABLE HOUSING PART

BACKGROUND AND SUMMARY OF THE INVENTION

The invention relates to a pump arrangement with at least one temperature-controllable casing part.

Pump arrangements of this type are often used in industrial plants, in particular in chemistry and petrochemistry. These pump arrangements frequently pump or convey media which can only be conveyed or pumped at a specific temperature.

Such a medium is for example sulfur. If the temperature drops or rises too greatly at certain points in the pump during the pumping process, the medium can crystallize out and thus cause the pump to run dry. Furthermore, crystallizing out in this manner can also contaminate the conveyed medium.

Another example is conveying heavy oil or bitumen. To convey these media, the pumps used must be preheated for example at very low temperatures in order to prevent the pump from running dry, since, without prior heating, heavy oil and bitumen are too viscous to be pumped.

Inter alia in the case of process pumps, precise control of the temperature is critically important, since fluctuating temperatures can disrupt an entire plant process.

Known heatable spiral casings have the disadvantage that they consist of a plurality of individual parts which are usually interconnected by welding. If the weld points are not welded correctly, leakages can occur at these points, which substantially impairs the function of the pump.

In addition, in the case of welded constructions of this type, it is difficult to uniformly control the temperature of the whole casing including the flanges.

In conventional pumps, the forces and moments on the pipes and the inlet and outlet openings can deform the casing and lead to the impeller running onto adjacent components of the pump.

The point in the process flow/the location on the pump at which a slide ring seal is usually arranged, in particular the region between the shaft and the casing cover of a pump, has in practice proven to be a critical region in which problems relating to providing the required temperature occur relatively frequently.

At this point, the heating of the casing cover/spiral casing of the pump is often not sufficient to achieve an optimum temperature for conveying a specific medium.

In addition, conventional sealing covers have the additional disadvantage that they consist of a plurality of individual parts which are usually interconnected by welding. If the weld points are not welded correctly, leakages can occur at these points, which further impairs the function of the pump.

In addition, in the case of sealing covers of this type, it is difficult or impossible in practice to additionally arrange lines which extend through any cooling/heating chamber arranged in the sealing cover. For example, in order to provide external circulation in a conventional sealing cover, the heating space of the sealing cover would have to be drilled through.

The present invention addresses the problem of reducing or even completely remedying the deficiencies of the devices known from the prior art. More specifically, the problem addressed by the present invention is that of providing a pump arrangement by means of which the conveying of media at an optimum conveying temperature is ensured.

This problem is solved by a pump arrangement having the features of claim 1, according to which the at least one temperature-controllable casing part comprises a first wall the temperature-controllable medium, and a second wall which is at a distance from the first wall, the first wall and the second wall forming a temperature-control chamber.

In this case, it has proven to be particularly advantageous when, in the temperature-control chamber, there is at least one channel extending in a circular shape arranged substantially concentrically with the axis of rotation.

It has proven to be particularly advantageous when, in the temperature-control chamber, a plurality of struts are provided which connect the inner wall to the outer wall and form channels extending in a circular shape arranged substantially concentrically with the axis of rotation. It is thereby ensured that, even when a channel or even a plurality of channels is/are blocked, the component can be heated or cooled.

So that all the channels can be flowed through at the same time, a first collection chamber and a second collection chamber are formed in the temperature-control chamber.

When necessary, forming a third collection chamber makes it simpler to completely empty the channels.

So that the cooling or heating medium can be supplied to or discharged from the temperature-control chamber in a user-friendly manner, a first connecting device is provided for a supply line, by means of which device the cooling or heating medium flows into the temperature-control chamber in order to control the temperature of the hydraulic casing. Furthermore, a second connecting device is provided to connect a supply line, by means of which the cooling or heating medium flows back out of the temperature-control chamber.

In order to ensure, when necessary, that the temperature-control chamber is completely emptied in a simple manner, the temperature-controllable component comprises a third connecting device connected to the third collection chamber for connecting an additional line.

Advantageously, the at least one channel or channels comprise a defined structure which is used to maximize turbulence in the cooling or heating medium and thus to maximize the heat exchange.

To be able to ensure a uniform temperature distribution, it is advantageous to design the outer wall and inner wall to be as thin as possible. So that the temperature-controllable component can reliably withstand the pressure inside, the component advantageously comprises a support structure. The support structure absorbs the forces and moments occurring for example on suction pipes and pressure pipes and dissipates them. In addition, the component is reinforced while maintaining a minimal operating weight, as a result of which for example the risk of the impeller dragging against a split ring which is conventionally accommodated in the hydraulic casing, or against part of the hydraulic casing, is minimized. The support structure formed on the outer wall by accumulation of material thus supports and relieves pressure on both the relatively thin inner wall and the relatively thin outer wall of the hydraulic casing.

In this case, it is particularly advantageous for the support structure to interconnect defined construction elements of the component, in particular casing feet, suction pipes, pressure pipes and connection points, to which additional components of the pump arrangement can be fixed.

Another advantageous embodiment provides that the support structure comprises substantially horizontally, vertically and diagonally extending accumulations of material which form interconnection or intersection points.

It has proven to be particularly advantageous for free ends of the support structure to comprise blind holes for receiving suitable fixing means, in particular screws or threaded bolts. In this case, internal threads are advantageously provided, into which the fixing means can be screwed.

Another problem addressed by the present invention consists in providing a method for producing a hydraulic casing for a pump arrangement as an integral component by means of 3D-printing, in particular metal 3D-printing, selective laser melting (SLM) or by means of precision casting.

Further advantages, features and effects of the present invention can be found in the following drawings, in which:

BRIEF DESCRIPTION

Figure 1:
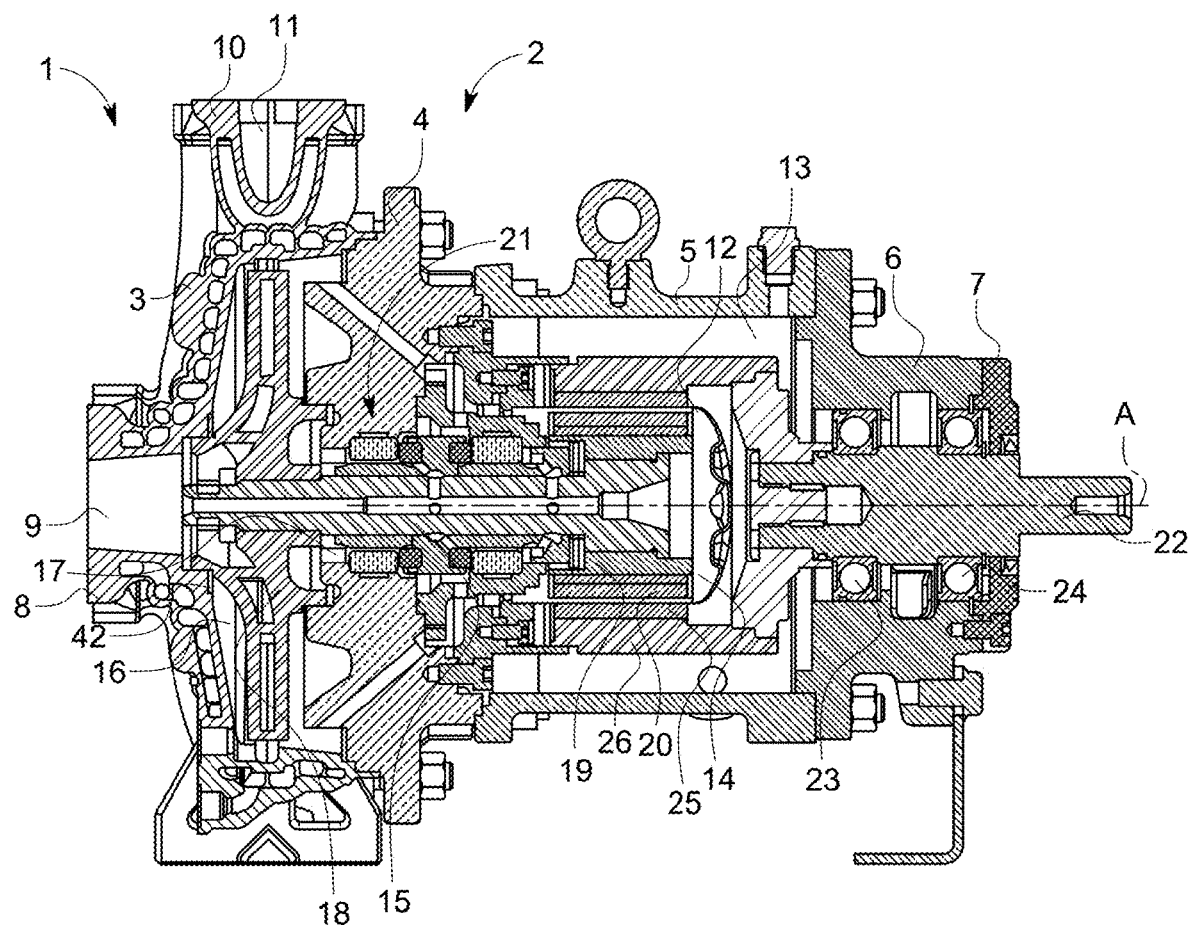
FIG. 1 is a longitudinal sectional view through a pump arrangement with a hydraulic casing according to an embodiment of the invention.

FIG. 1 shows a pump arrangement 1 in the form of a magnetic drive pump arrangement. The pump arrangement 1 comprises a multi-part pump casing 2 of a centrifugal pump which has a temperature-controllable component 3 in the form of a hydraulic casing, a casing cover 4, a bearing carrier base 5, a bearing carrier 6 and a bearing cover 7.

The component 3, which is in the form of a hydraulic casing in the present example, comprises an inlet opening 9 on a suction pipe 8 for sucking in a conveying medium, and an outlet opening 11 on a pressure pipe 10 for ejecting the conveying medium. The casing cover 4 is arranged on the side of the hydraulic casing 3 which is opposite the inlet opening 9. The bearing carrier base 5 is fixed to the side of the casing cover 4 which faces away from the hydraulic casing 3. The bearing carrier 6 is attached to the side of the bearing carrier base 5 which is opposite the casing cover 4. In turn, the bearing cover 7 is fixed to the side of the bearing carrier 6 which faces away from the bearing carrier base 5.

A separating can 12 is fixed to the side of the casing cover 4 which faces away from the hydraulic casing 3 and extends at least in part through an interior 13 which is delimited by the pump casing 2, in particular by the casing cover 4, the bearing carrier base 5 and the bearing carrier 6. The separating can 12 hermetically seals a chamber 14, surrounded by the separating can, with respect to the interior 13.

An impeller shaft 15 which is rotatable about an axis of rotation A extends from a flow chamber 16 delimited by means of the hydraulic casing 3 and the casing cover 4 through an opening 17 provided in the casing cover 4 into the chamber 14.

An impeller 18 is fixed to a shaft end, located inside the flow chamber 16, of the impeller shaft 15, and an inner rotor 19 which is arranged inside the chamber 14 is arranged at the opposite shaft end. The inner rotor 19 is equipped with a plurality of magnets 20 which are arranged on the side of the inner rotor 19 facing the separating can 12.

A bearing arrangement 21 which is operatively connected to the impeller shaft 15, which is rotatably drivable about the axis of rotation A, is arranged between the impeller 18 and the inner rotor 19.

A drive motor (not shown), preferably an electric motor, drives a drive shaft 22. The drive shaft 22, which is rotatably drivable about the axis of rotation A, is arranged substantially coaxially with the impeller shaft 15. The drive shaft 22 extends through the bearing cover 7 and the bearing carrier 6 and is mounted in two ball bearings 23, 24 accommodated in the bearing carrier 6. An outer rotor 26 which supports a plurality of magnets 25 is arranged at the free end of the drive shaft 22. The magnets 25 are arranged on the side of the outer rotor 26 facing the separating can 12. The outer rotor 26 extends at least in part over the separating can 12 and interacts with the inner rotor 19 in such a way that the rotating outer rotor 26, by means of magnetic forces, also sets the inner rotor 19 and thus the impeller shaft 15 and the impeller 18 into rotation.

Figure 2:
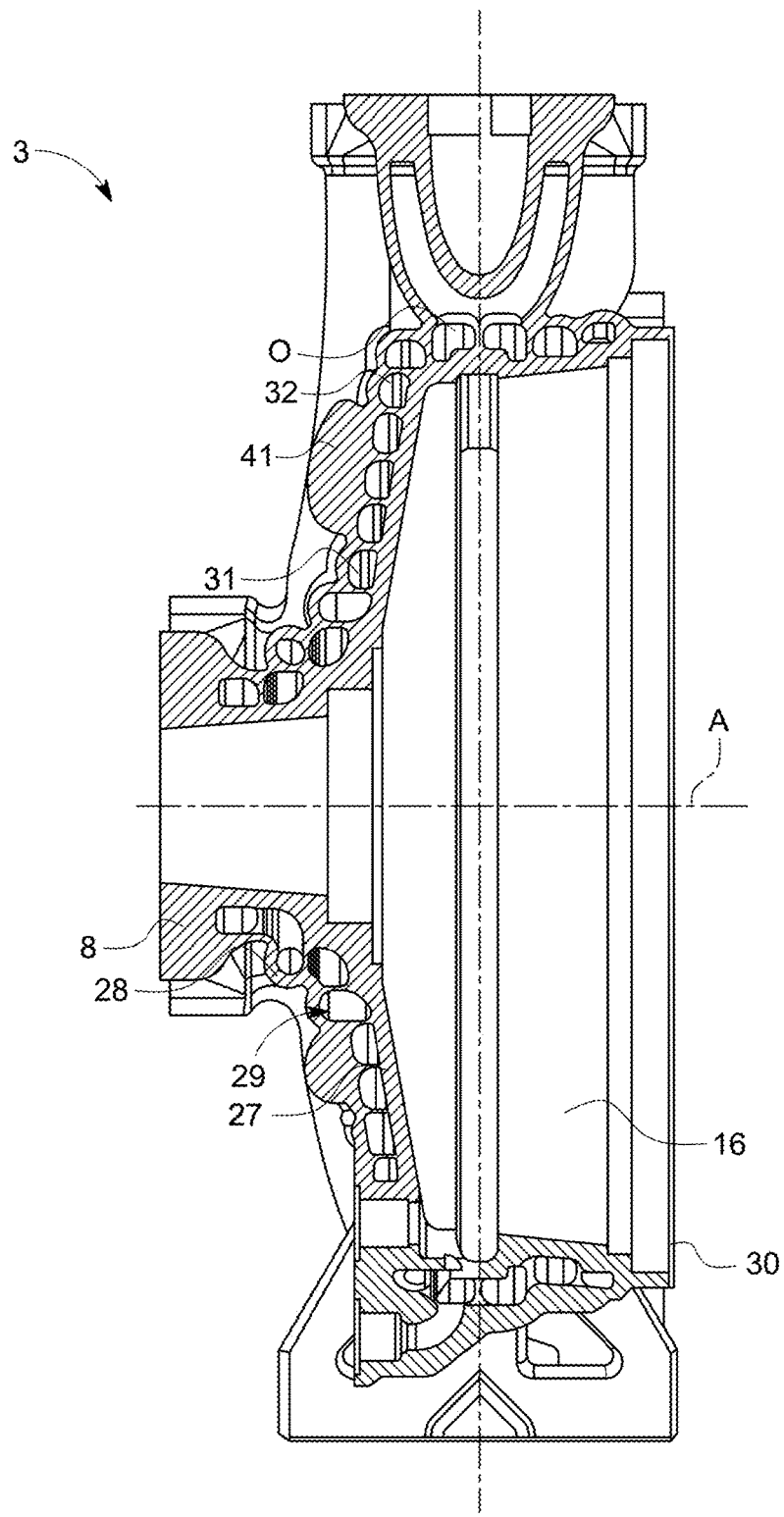
FIG. 2 is an enlarged longitudinal sectional view through the hydraulic casing according to FIG. 1.
Figure 3:
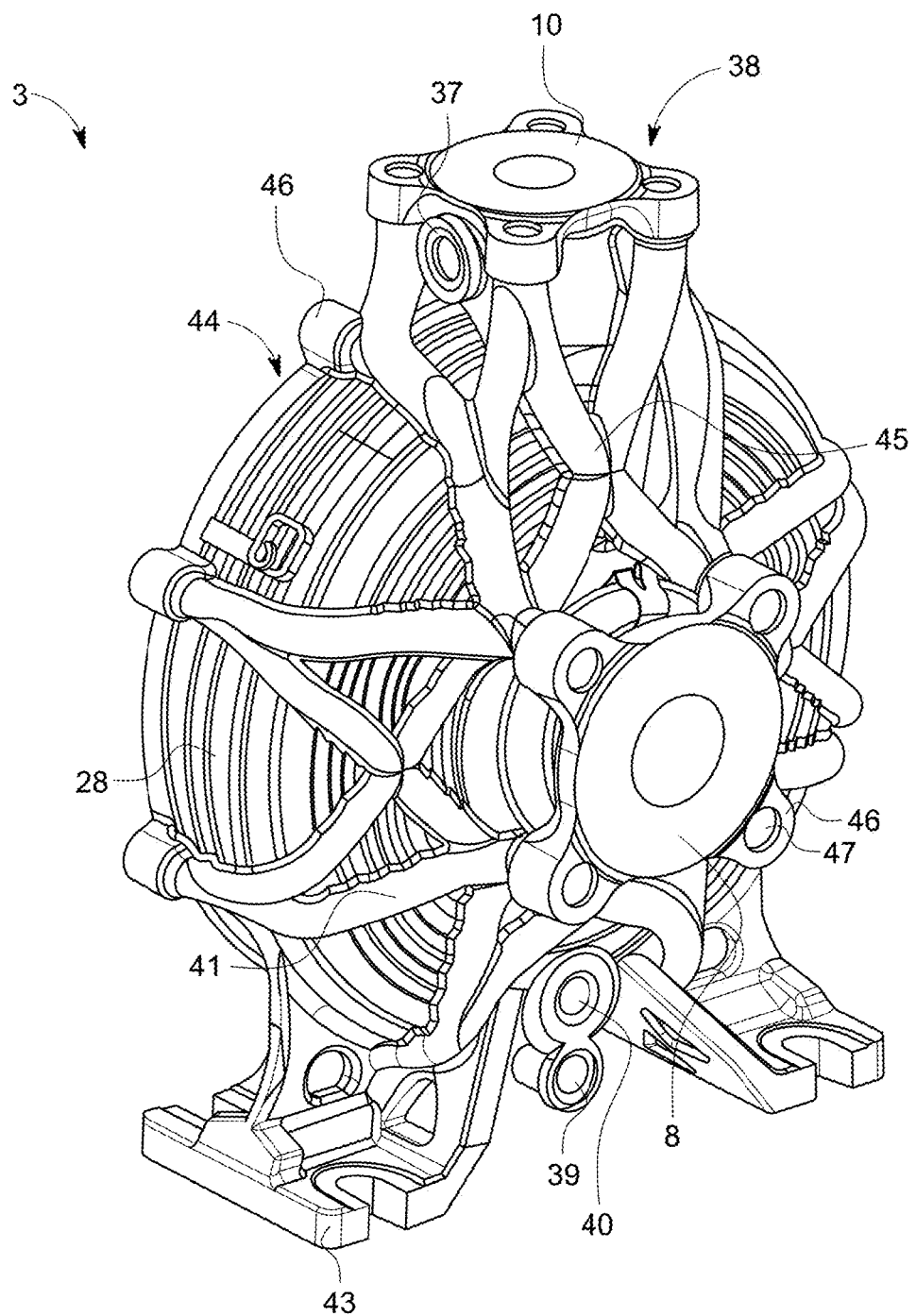
FIG. 3 is a perspective view of the hydraulic casing according to FIG. 2.
Figure 4:
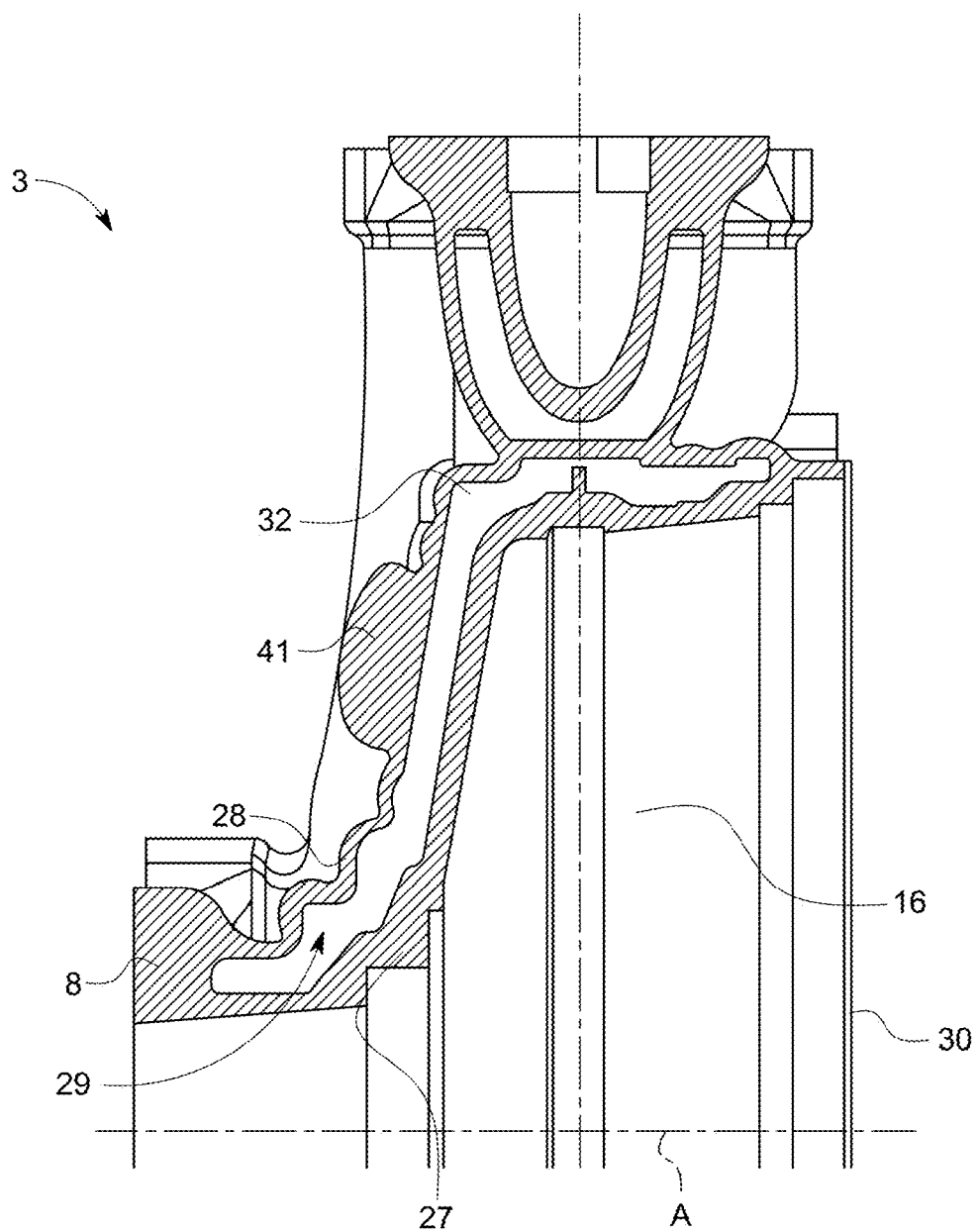
FIG. 4 is a longitudinal sectional view through an additional embodiment of the hydraulic casing according to the invention.

FIGS. 2, 3 and 4 show exemplary embodiments of the hydraulic casing 3 in detail. The hydraulic casing 3 comprises a first wall or inner wall 27, and a second wall or outer wall 28 which is at a distance from the inner wall 27. The inner wall 27 and outer wall 28 form or define a temperature-control chamber 29. The temperature-control chamber 29 extends between the inner wall 27 and outer wall 28 and substantially over the part of the inner wall 27 defining the flow chamber 16. That is to say, from a surface 30 of the hydraulic casing 3 with which the casing cover 4 is in contact, over the entire hydraulic casing 3 as far as the suction pipe 8. In the exemplary embodiment shown, a plurality of struts 31 are provided in the temperature-control chamber 29, which struts connect the inner wall 27 to the outer wall 28. As a result, as shown schematically in FIG. 5, channels 32 extending in a circular shape are produced, which are arranged substantially concentrically with the axis of rotation A. If the struts are omitted, a channel 32 extending in a circular shape is produced, which in cross section, as shown in FIG. 4, has a substantially S-shaped curve profile.

Figure 5:
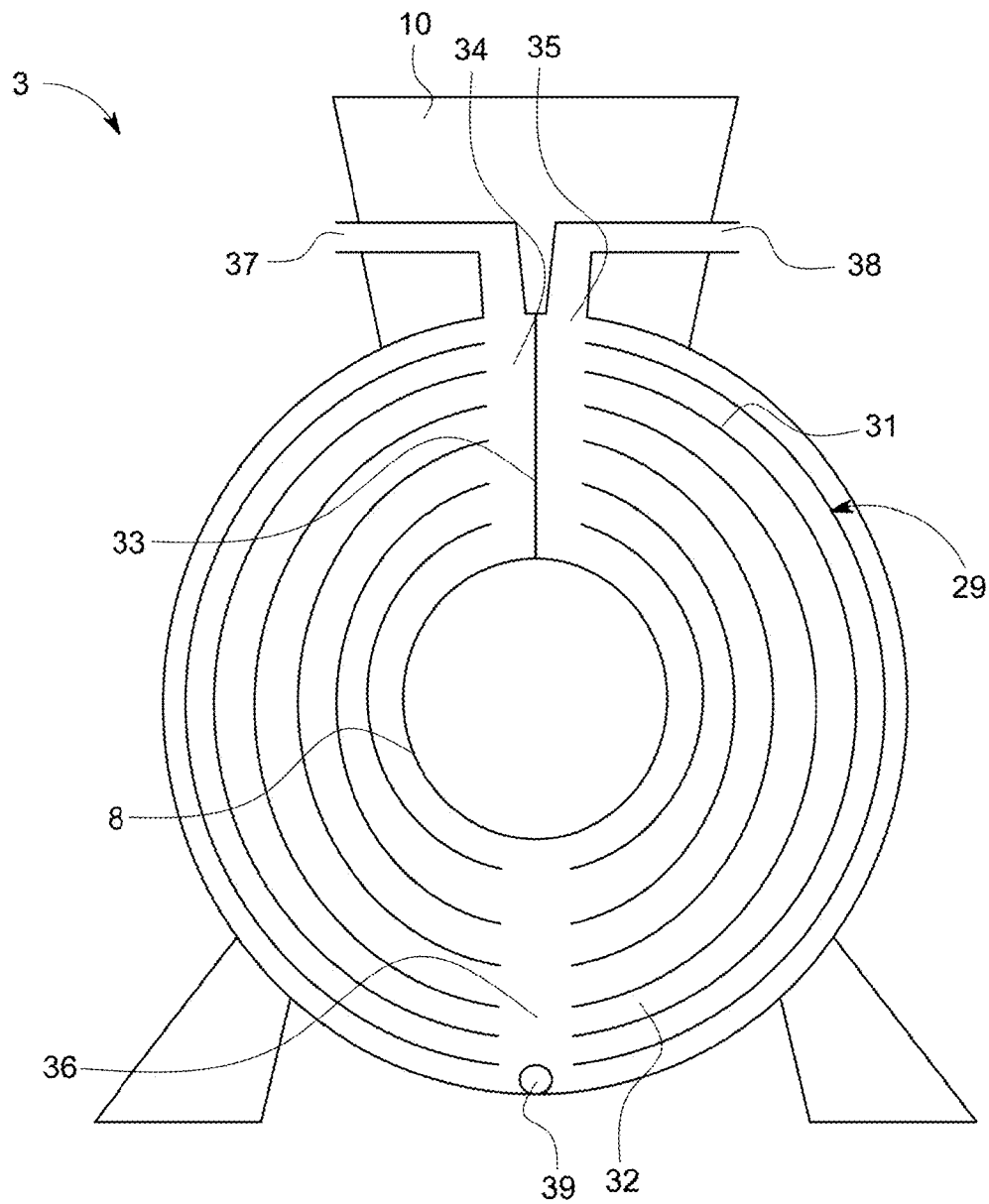
FIG. 5 is a schematic view of an embodiment of the hydraulic casing according to the invention.
Figure 6A:
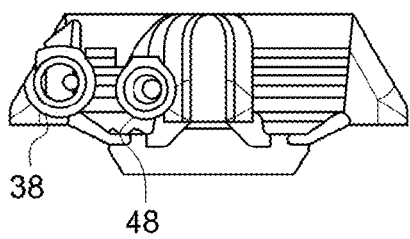
FIG. 6 shows various views of a sealing cover according to an embodiment of the invention.
Figure 6B:
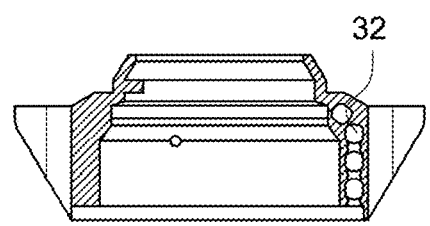
Figure 6C:
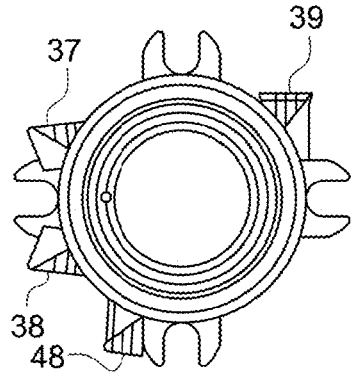
Figure 6D:
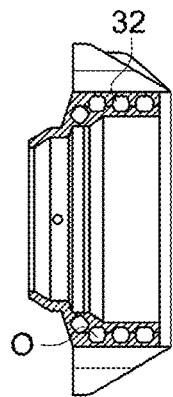
Figure 6E:
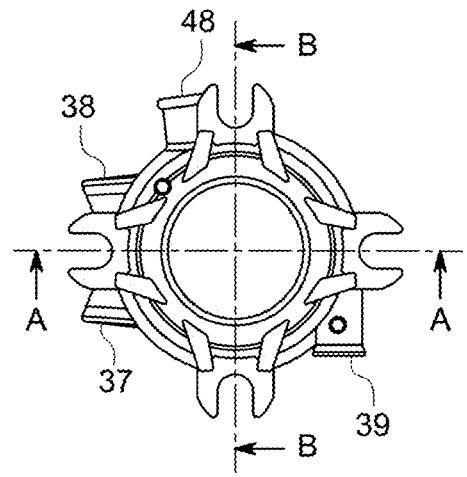
Figure 6F:
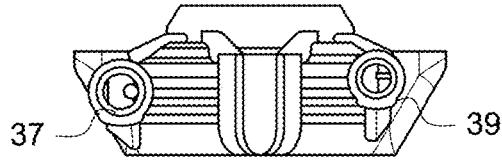
Figure 6G:
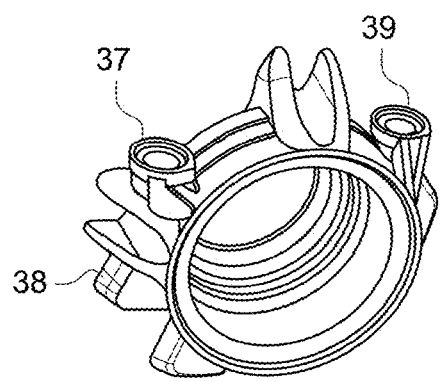
Figure 6H:
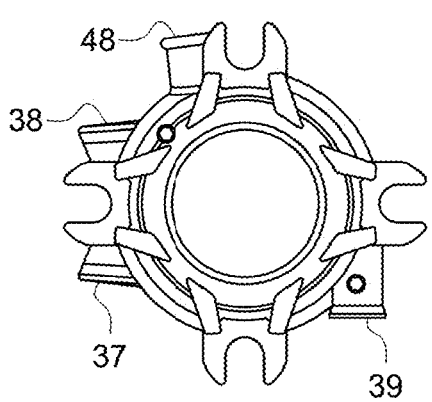
Figure 6I:
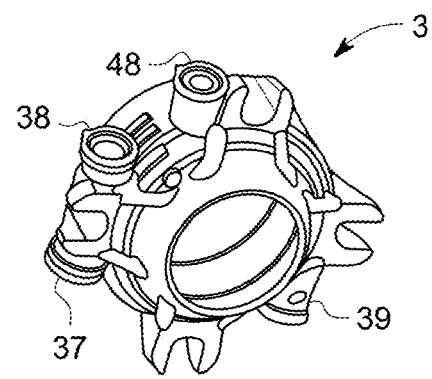

As shown in FIG. 5, in a region which extends from the suction pipe 8 to the pressure pipe 10, the struts 31 and the channels 32 are not continuous, that is to say they are interrupted. A connecting piece shown in FIG. 5, which extends from the pressure pipe 10 to the suction pipe 8, which connects the inner wall 27 and the outer wall 28, forms a dividing wall 33 in the temperature-control chamber 29. In this case, the struts 31 do not touch the dividing wall 33, so that, as shown schematically in FIG. 5, a first collection chamber 34 and a second collection chamber 35 are formed in the temperature-control chamber 29. The first collection chamber 34 and second collection chamber 35 comprise, starting from a region close to the suction pipe 8, a substantially radial extension, in particular towards the pressure pipe 10. In a radially extending region which, when the hydraulic casing 3 is stationary, is located underneath the suction pipe 8, the struts 31 likewise do not have a continuous design. A third collection chamber 36, which is shown schematically in FIG. 5, is formed thereby.

As shown in FIG. 3, a first connecting device 37 is provided on the pressure pipe 10, by means of which device a cooling or heating medium for controlling the temperature of, that is to say for cooling and/or heating the hydraulic casing 3, can flow into the temperature-control chamber 29. A second connecting device, to which the reference sign 38 refers, by means of which device the cooling or heating medium can flow back out of the temperature-control chamber 29, is arranged opposite the first connecting device 37. The arrangement of the second connecting device 38 can best be seen in FIG. 5.

The hydraulic casing 3 comprises a third connecting device 39 which is connected to the third collection chamber 36, which device is provided to completely empty the temperature-control chamber 29. The connecting device 39 is arranged in such a way that the temperature-control chamber 29 is emptied substantially in the axial direction. The connecting device 39 is designed to completely drain the contained cooling or heating medium at the lowest point of the temperature-control chamber 29.

The channel 32 or channels 32 comprise a defined structure O which is used to maximize turbulence in the cooling or heating medium and thus to maximize the heat exchange. In the exemplary embodiment shown, there are channels 32, which are for example circular, oval, substantially L or V-shaped or comprise depressions. The struts 31 can have for example a winged profile. The channel 32 or channels 32 and the struts 31 can also comprise bionic structures, for example a structure like sharkskin. In the embodiment shown by way of example, the outer wall 28 comprises, on the side pointing towards the external environment, a defined surface structure O, in particular a corrugated surface structure O.

As can be seen from FIGS. 2 and 3, the hydraulic casing 3 comprises a fourth connecting device 40, which is intended to completely empty the flow chamber 16. The connecting device 40 is arranged above the connecting device 39. The connecting device 40 is arranged in such a way that the flow chamber 16 is emptied substantially in the axial direction.

In order to cool or heat the hydraulic casing 3, the cooling or heating medium flows via the first connecting device 37 into the first collection chamber 34 of the temperature-control chamber 29 and from there into the individual channels 32 which are fluidically directly interconnected, then finally into the second collection chamber 35 and from there, out of the temperature-control chamber 29 via the second connecting device 38. In this process, a uniform temperature distribution over the hydraulic casing 3 is achieved.

It is understood that the cooling or heating medium can also be supplied to the temperature-control chamber 29 via the second connecting device 38 and flows out of the temperature-control chamber 29 via the first connecting device 37.

As shown in FIGS. 2 to 4, the hydraulic casing 3 additionally comprises a support structure 41 which absorbs and dissipates the forces and moments occurring on suction pipes 8 and pressure pipes 10. In addition, the hydraulic casing 3 is thereby reinforced, which minimizes the risk of the impeller 18 dragging against a split ring 42 shown in FIG. 1 or against part of the hydraulic casing 3. The support structure 41 formed on the outer wall 28 by accumulation of material thus supports and relieves pressure on both the relatively thin inner wall 27 and the relatively thin outer wall of the hydraulic casing 3. The support structure 41 interconnects defined construction elements of the hydraulic casing, in particular casing feet 43, suction pipes 8, pressure pipes 10 and connection points 44, to which additional components of the pump arrangement can be fixed, for example the casing cover 4.

The support structure 41 is designed to be optimized in terms of the flow of forces and in terms of topology. The support structure 41 comprises accumulations of material extending substantially horizontally, vertically and diagonally, which form interconnection or intersection points 45. Free ends 46 of the support structure 41 comprise blind holes 47, which are provided to receive fixing means (not shown), for example screws or threaded bolts.

FIG. 1 shows a pump arrangement 1 in the form of a magnetic drive pump arrangement. However, it can be seen that the hydraulic casing 3 according to the invention can be used in other pump arrangements, for example canned motor pumps or in-line pumps of any pumps without a magnetic drive.

As shown in FIGS. 6a-6i, another embodiment of the temperature-controllable component 3, which in the example shown is in the form of a sealing cover, in particular for accommodating a side ring seal, comprises a connecting device 37 or inlet for cooling/heating medium and a second connecting device 38 or outlet for cooling/heating medium. The first connecting device 37 and second connecting device 38 are arranged opposite one another. The temperature-control medium is thus guided through the annular component 3. As described in relation to FIG. 5, a dividing wall (not shown here) can be provided in the temperature-control chamber so that a first collection chamber and a second collection chamber are formed in the temperature-control chamber.

The cooling/heating medium circulates in at least one channel 32, which is formed inside the temperature-controllable component 3 and provided with defined surface structures O for maximizing turbulence in the cooling/heating medium and thus for maximizing the heat exchange.

In addition, the sealing cover 3 comprises a third connecting device 39 which can be used to drain the contained cooling/heating medium at the lowest point of the cooling/heating channel 32 or of the temperature-control chamber which is not shown in the case of the sealing cover. For external circulation, a fifth connecting device 48 can be provided, which can be conducted back out of the component 3 via the third connecting device.

As shown in FIGS. 7a-7i, the temperature-controllable component 3 according to the invention can additionally be equipped with a sixth connecting device 49 or inlet for quenching medium and a seventh connecting device 50 or outlet for quenching medium.

Figure 7A:
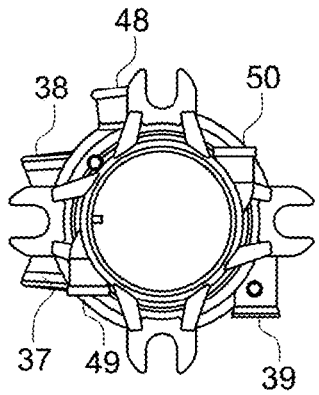
FIG. 7 shows various views of a sealing cover comprising a connection for quenching medium according to an embodiment of the invention.
Figure 7B:
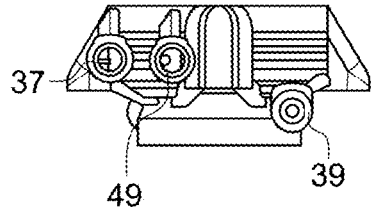
Figure 7C:
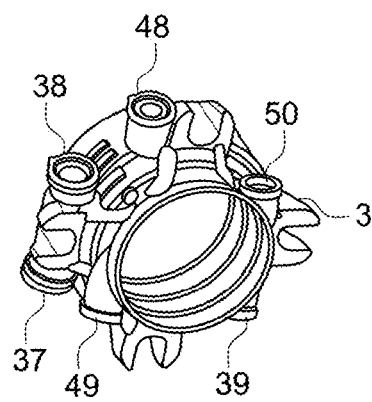
Figure 7D:
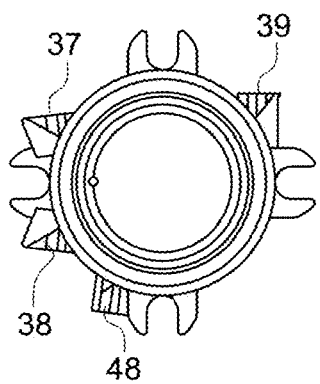
Figure 7E:
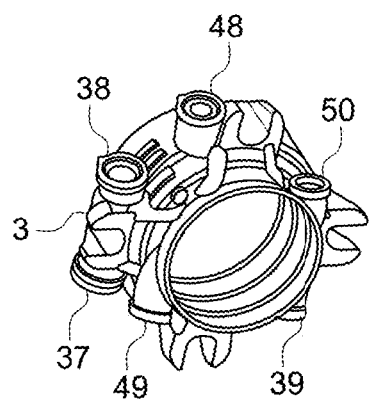
Figure 7F:
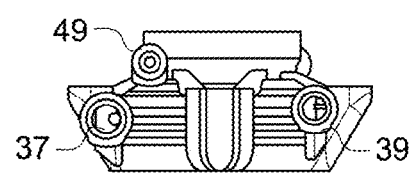
Figure 7G:
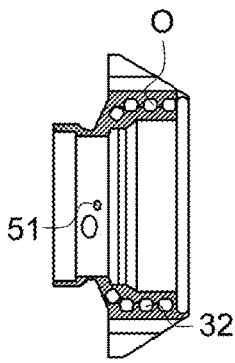
Figure 7H:
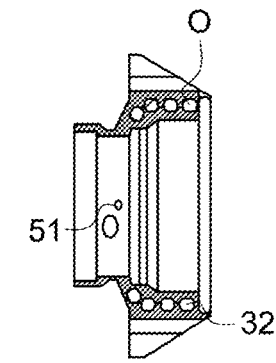
Figure 7I:
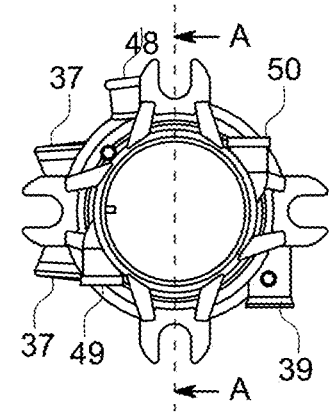

In FIGS. 7g and 7h, it can also be seen that an anti-rotation lock 51 of a slide ring seal is integrated in the temperature-controllable component 3.

The casing parts 3 described above for a pump arrangement 1 are advantageously produced as an integral component by means of 3D-printing, in particular metal 3D-printing, selective laser melting (SLM) or by means of precision casting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A pump arrangement that is configured to convey media at certain temperatures, comprising:
    a hydraulic casing;
    a casing cover;
    a first connector;
    a second connector;
    a flow chamber that is formed by the hydraulic casing and the casing cover;
    an impeller shaft that is drivable rotatably about an axis of rotation;
    an impeller fastened to an end of the impeller shaft located within the flow chamber;
    a suction pipe; and
    at least one temperature-controllable casing part, wherein the at least one temperature-controllable casing part comprises a first wall, which is in contact with a temperature-controllable medium and a second wall, which is at a distance from the first wall,
    the first wall and the second wall form a temperature-control chamber that is configured to control a temperature of the hydraulic casing,
    a plurality of struts that are provided in the temperature-control chamber, and that connect the first wall to the second wall and form channels extending in a circular shape arranged concentrically with the axis of rotation,
    a first collection chamber and a second collection chamber are formed in the temperature-control chamber,
    the first collection chamber and the second collection chamber are connected fluidically to each other via the channels,
    a third collection chamber that is formed by an interruption of the struts,
    the first connector guides a cooling or heating medium into the first collection chamber of the temperature-control chamber in order to control the temperature of the hydraulic casing,
    the second connector guides the cooling or the heating medium back out of the second collection chamber of the temperature-control chamber, and
    the first collection chamber and the second collection chamber, starting from a region close to the suction pipe, comprise a radial extension.

2. The pump arrangement according to claim 1, wherein the hydraulic casing comprises a third connector which is connected to the third collection chamber and that is provided to completely empty the temperature-control chamber.

3. The pump arrangement according to claim 1, wherein the channels comprise a defined structure which maximizes turbulence in the cooling or the heating medium and thus maximizes heat exchange.

4. The pump arrangement according to claim 1, wherein the hydraulic casing comprises a support structure.

5. The pump arrangement according to claim 4, wherein the support structure interconnects casing feet, suction pipes, pressure pipes, and connection points, to which additional components of the pump arrangement are fixable.

6. The pump arrangement according to claim 4, wherein the support structure comprises horizontally, vertically, and diagonally extending accumulations of material, which form interconnection or intersection points.

7. The pump arrangement according to claim 4, wherein free ends of the support structure comprise blind holes configured to receive fixing means, and wherein the fixing means are screws or threaded bolts.

* * * * *